R. D. & C. D. GODWIN.
NUT LOCK.
APPLICATION FILED MAR. 27, 1917.
1,253,958.
Patented Jan. 15, 1918.
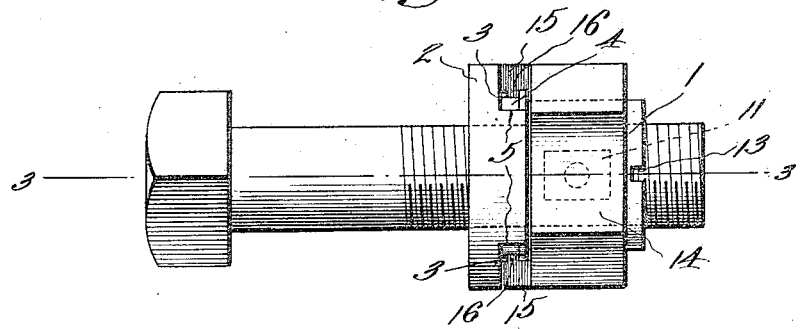
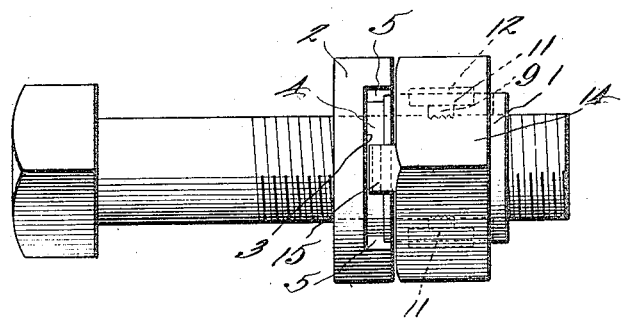
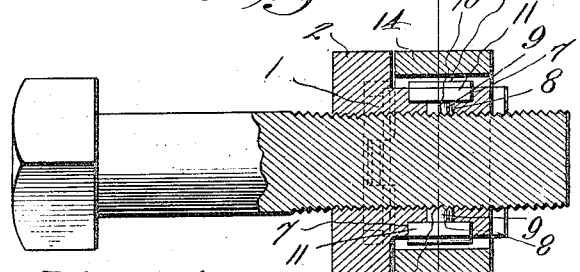
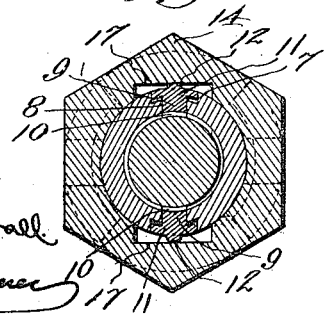
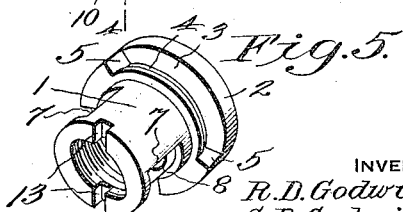
WITNESSES
INVENTORS
R. D. Godwin and
C. D. Godwin
BY Victor J. Evans
ATTORNEY

UNITED STATES PATENT OFFICE.

RAYMOND D. GODWIN AND CHARLEY D. GODWIN, OF CEMENT, OKLAHOMA.

NUT-LOCK.

1,253,958. Specification of Letters Patent. Patented Jan. 15, 1918.

Application filed March 27, 1917. Serial No. 157,719.

*To all whom it may concern:*

Be it known that we, RAYMOND D. GODWIN and CHARLEY D. GODWIN, citizens of the United States, residing at Cement, in the county of Caddo and State of Oklahoma, have invented new and useful Improvements in Nut-Locks, of which the following is a specification.

This invention relates to improvements in nut locks, the object of the invention being to provide a nut with means for locking the nut on the bolt on which it is used so that the nut can not become loosened, the invention embodying a nut having a radial opening extending through the threads, in combination with a thread engaging member arranged and radially movable in said opening, and a sleeve mounted for turning movement on the nut and having a cam face to force the nut engaging member inwardly when the sleeve is turned to one position and thereby cause said member to engage the threads of the bolt and firmly lock the nut in place, the nut and sleeve being provided with stops to limit the turning movement of the sleeve on the nut as hereinafter described and claimed.

In the accompanying drawings:—

Figure 1 is a side elevation of a nut provided with locking devices constructed and arranged in accordance with this invention, and showing the same on a bolt.

Fig. 2 is a plan of the same.

Fig. 3 is a sectional view of the same on the plane indicated by the line 3—3 of Fig. 2.

Fig. 4 is a similar view on the plane indicated by the line 4—4 of Fig. 3.

Fig. 5 is a detailed perspective view of the nut.

The nut 1 is cylindrical and is provided with a diametrically enlarged base 2 which has segmental recesses 3 in opposite sides and also has a segmental channel 4 in the inner wall of each recess, stops 5 being formed at the ends of the recesses. The nut is also provided with radial openings 7 in opposite sides at points midway between the recesses and at the outer end of each opening 7 is a recess 8. Thread engaging members 9 are provided which are here shown as studs arranged for slight radial movement in the openings 7 and provided at their inner ends with threaded portions 10 coincident with the threads of the nut and provided at their outer ends with enlarged heads 11 which are arranged in the recesses 8 and each of which has a cam 12 on its outer side. The nut is provided at its outer end with oppositely arranged notches 13 for engagement by the lugs of a spanner wrench or other tool to enable the nut to be held against turning as when the device is being assembled and disassembled.

A sleeve 14 is also provided which is arranged for turning movement on the nut and is provided at the inner end with stops 15 to travel in the recesses 3 and coact with the stops 5 in limiting the tending movement of the sleeve on the nut. Said lugs or stops 15 are provided in their opposing sides with flanges 16 which travel and engage in the grooves 4 so that the sleeve while permitted to turn to some extent on the nut is prevented from being casually detached therefrom. These flanges are bent inwardly into engagement with the grooves when assembling the device. On its inner side the sleeve is provided with oppositely arranged cam faces 17. When the sleeve is turned on the nut to arrange the cams 12 of the thread engaging members 10 midway between the ends of the cam faces 17 said cam faces force said members 10 inwardly and thereby cause their inner ends to firmly grip the threads of the bolt on which the nut is used and thereby prevent locking the nut on the bolt. When the sleeve is turned to arrange the ends of said cam faces opposite the cams 12 of the members 10 said cam faces are out of engagement with and are spaced from said members 10, thus releasing the latter and permitting the nut to be screwed from the bolt. The sleeve is polygonal in form and thereby adapted to be engaged by a wrench and used in screwing the nut on or removing the same from the bolt. When turning the sleeve on the nut to lock or release the nut, the latter must be held against turning movement and this may be accomplished by engaging the notches 13 of the nut by the lugs of a spanner wrench or other suitable tool.

While we have herein shown and described a preferred form of my invention we would have it understood that changes may be made in the form, proportion and construction of the several parts, without departing from the spirit of our invention and within the scope of the appended claim.

Having thus described our invention, what we claim is:—

The combination of a cylindrical nut having a radial opening intersecting the screw threads and also having a base provided with a segmental recess, a segmental channel in the inner wall of the recess and stops at the ends of the recess; a thread engaging member arranged for slight radial movement in said radial opening of the nut, and a sleeve mounted for turning movement on the nut and having a cam face opposite the outer end of said thread engaging member, to move said member inwardly when the sleeve is in one position on the nut and to release said member when the sleeve is in another position on the nut, the sleeve being further provided with a lug arranged for movement in the segmental recess of the nut base, said lug having a flange engaging in said channel.

In testimony whereof we affix our signatures.

RAYMOND D. GODWIN.
CHARLEY D. GODWIN.

Copies of this patent may be obtained for five cents each, by addressing the "Commissioner of Patents, Washington, D. C."